US011333490B2

(12) United States Patent
Glinec

(10) Patent No.: US 11,333,490 B2
(45) Date of Patent: May 17, 2022

(54) TARGET WITH FEATURES FOR 3-D SCANNER CALIBRATION

(71) Applicant: Carestream Dental Technology Topco Limited, London (GB)

(72) Inventor: Yannick Glinec, Mountevrain (FR)

( * ) Notice: Subject to any disclaimer, the term of this patent is extended or adjusted under 35 U.S.C. 154(b) by 0 days.

(21) Appl. No.: 15/772,508

(22) PCT Filed: Oct. 30, 2015

(86) PCT No.: PCT/CN2015/093348
§ 371 (c)(1),
(2) Date: Apr. 30, 2018

(87) PCT Pub. No.: WO2017/070928
PCT Pub. Date: May 4, 2017

(65) Prior Publication Data
US 2018/0313644 A1 Nov. 1, 2018

(51) Int. Cl.
*G01B 11/25* (2006.01)
*A61C 9/00* (2006.01)
*G01B 21/04* (2006.01)

(52) U.S. Cl.
CPC .......... *G01B 11/2504* (2013.01); *A61C 9/006* (2013.01); *G01B 11/2513* (2013.01); *G01B 21/042* (2013.01)

(58) Field of Classification Search
CPC ................ G01B 21/02; G01B 9/02023; G01B 9/02029; G01B 9/0203; G01B 9/02031;
(Continued)

(56) References Cited

U.S. PATENT DOCUMENTS 5,557,410 A 9/1996 Huber et al.
5,612,786 A * 3/1997 Huber ................ G01B 11/2504
356/604
(Continued)

FOREIGN PATENT DOCUMENTS

CN 103917160 A 7/2014
CN 104780865 A 7/2015
(Continued)

OTHER PUBLICATIONS

Extended Search Report received in EP patent Application No. 15906991.3, dated May 24, 2019, 10 pages.
(Continued)

*Primary Examiner* — Michael P Stafira

(57) ABSTRACT

An apparatus (70) for surface contour imaging of an object has an illumination apparatus energizable to direct one or more illumination patterns (46) toward a surface position. A sensing apparatus (40) has at least one lens (34) and a sensor (30) that is energizable to obtain one or more images of the surface position corresponding to the illumination patterns (46). A calibration target (100) is detachably coupled to the apparatus (70) in the surface position, wherein the calibration target (100) has a set having a plurality of raised features (50) that are uniformly spaced apart with respect to first and second orthogonal axes that define a first plane and having a uniform height along a height axis that is orthogonal to the first plane. The raised features (50) further have at least a first slanted surface (54) that is oblique with respect to the first plane and oblique with respect to the height axis.

18 Claims, 16 Drawing Sheets

(58) Field of Classification Search
CPC .. G01B 9/0205; G01B 21/04; G01B 11/2513; G01B 11/002; G01B 11/022; G01B 11/03; G01B 11/14; G01B 11/24; G01B 11/245; G01B 11/2504; G01B 11/2536; G01B 11/2518; G01B 15/02; G01B 21/042; G01B 9/02091; G02B 27/2292; G02B 26/0833; G02B 26/10; G02B 26/101; G02B 27/0172; G02B 27/0176; G01N 1/08; G01N 21/93; G01N 21/956; G01N 1/42; G01N 2001/288; G01N 21/55; G01N 21/8806; G01N 35/0099; G01J 2005/0077; G01J 5/0025; G01J 5/025; G01J 5/0265; G01J 5/0859; G01J 5/089

See application file for complete search history.

(56) References Cited

U.S. PATENT DOCUMENTS

| | | | |
|---|---|---|---|
| 5,636,025 | A | 6/1997 | Bieman et al. |
| 6,045,502 | A * | 4/2000 | Eppstein ............... A61B 5/0059 600/306 |
| 7,869,026 | B2 | 1/2011 | Boyer et al. |
| 2003/0109773 | A1* | 6/2003 | Samuels ............... A61B 5/0059 600/315 |
| 2004/0141187 | A1 | 7/2004 | Johnston et al. |
| 2004/0217260 | A1 | 11/2004 | Bernardini et al. |
| 2005/0068523 | A1 | 3/2005 | Wang et al. |
| 2011/0096378 | A1* | 4/2011 | Wang ................. H04N 1/00013 358/498 |
| 2012/0237889 | A1 | 9/2012 | Nowak et al. |
| 2013/0120532 | A1 | 5/2013 | Milch |
| 2013/0120533 | A1 | 5/2013 | Milch |
| 2015/0018645 | A1* | 1/2015 | Farkas .................. A61B 90/96 600/317 |
| 2015/0288952 | A1 | 10/2015 | Popilka et al. |

FOREIGN PATENT DOCUMENTS

| | | |
|---|---|---|
| EP | 1 091 186 A2 | 4/2001 |
| EP | 1 422 496 A1 | 5/2004 |
| EP | 3 368 858 A1 | 9/2018 |
| WO | 2009/0139110 A1 | 11/2009 |
| WO | 2017/070928 A1 | 5/2017 |

OTHER PUBLICATIONS

International Search Report and Written Opinion received for PCT Application Serial No. PCT/CN2015/093348 dated, Jul. 22, 2016, 8 pages.

International Preliminary Report on Patentability received for PCT Application Serial No. PCT/CN2015/093348 dated May 11, 2018, 6 pages.

RUSU, Radu Bogdan, "Semantic 3D Object Maps for Everyday Manipulation in Human Living Environments", Institut fur Informatik, der Technischen Universitat Miinchen, 2009, 284 pages.

* cited by examiner

TARGET WITH FEATURES FOR 3-D SCANNER CALIBRATION

TECHNICAL FIELD

The disclosure relates generally to optical scanners for surface contour characterization and more particularly to a calibration target and methods of scanner calibration using the target.

BACKGROUND

A number of techniques have been developed for obtaining surface contour information from various types of objects in medical, industrial, and other applications. These techniques include optical 3-dimensional (3-D) measurement methods that provide shape and depth information using images obtained from patterns of light directed onto a surface.

Structured light imaging is one familiar technique that has been successfully applied for surface characterization. In structured light imaging, a pattern of illumination is projected toward the surface of an object from a given angle. The pattern can use parallel lines of light or more complex periodic features, such as sinusoidal lines, dots, or repeated symbols, and the like. The light pattern can be generated in a number of ways, such as using a mask, an arrangement of slits, interferometric methods, or a spatial light modulator, such as a Digital Light Processor from Texas Instruments Inc., Dallas, Tex. or similar digital micromirror device. Multiple patterns of light may be used to provide a type of encoding that helps to increase robustness of pattern detection, particularly in the presence of noise. Light reflected or scattered from the surface is then viewed from another angle as a contour image, taking advantage of triangulation in order to analyze surface information based on the appearance of contour lines or other patterned illumination.

Structured light imaging has been used effectively for surface contour imaging of solid, highly opaque objects and has been used for imaging the surface contours for some portions of the human body and for obtaining detailed data about skin structure. Recently, structured light imaging methods have been applied to the problem of dental imaging, helping to provide detailed surface information about teeth and other intraoral features. Intraoral structured light imaging is now becoming a valuable tool for the dental practitioner, who can obtain this information by scanning the patient's teeth using an inexpensive, compact intraoral scanner, such as the Model CS3500 Intraoral Scanner from Carestream Dental, Atlanta, Ga.

In order to provide accurate 3-D surface contour characterization, a contour scanning apparatus must be reasonably well calibrated. Even slight changes in adjustment resulting from continued handling or drift from factory-calibrated settings over time can adversely impact scanner performance. It can be appreciated that the capability to validate and adjust scanner calibration on-site can be beneficial for both the scanner manufacturer and the end-user.

There have been a number of tools and techniques proposed for calibration of various types of 3-D contour scanners and stereo viewing apparatus, including the following, for example: U.S. Pat. No. 7,869,026 to Boyer et al.; US Patent Application Publication No. 2005/0068523 by Wang et al.; EP 1 422 496 A1 to Otani et al. However, solutions such as those presented in the literature, while they may have achieved some level of success for device calibration in other fields, fall short of what is workable and practical for portable 3-D scanning apparatus, such as those used for intraoral imaging. Among other difficulties, conventional calibration solutions are not generally intended for use by the end-user.

Thus, it can be appreciated that there is a need for a straightforward calibration approach that is particularly well suited for use with portable contour scanning apparatus, including intraoral imaging devices.

SUMMARY

An aspect of this application is to advance the art of surface contour characterization by providing apparatus and methods that facilitate accurate calibration of a scanner that obtains images of a surface for contour analysis.

Another aspect of this application is to address, in whole or in part, at least the foregoing and other deficiencies in the related art.

It is another aspect of this application to provide, in whole or in part, at least the advantages described herein.

Exemplary method and/or apparatus embodiments according to the application can address the need for improved calibration tools and calibration methods that allow advantages such as on-site recalibration of the scanner system by the end-user, for example.

These objects are given only by way of illustrative example, and such objects may be exemplary of one or more embodiments of the present disclosure. Other desirable objectives and advantages inherently achieved by embodiments of the application may occur or become apparent to those skilled in the art. The invention is defined by the appended claims.

According to one aspect of the disclosure, there is provided an apparatus for surface contour imaging, that can include an illumination apparatus energizable to direct one or more illumination patterns toward a surface position; a sensing apparatus comprising at least one lens and a sensor that is energizable to obtain one or more images of the surface position corresponding to the illumination patterns; and a calibration target detachably coupled to the apparatus in the surface position, wherein the calibration target comprises a set having a plurality of 3D features that are uniformly spaced apart a first distance along the first direction and uniformly spaced apart a second distance along a second direction, where the first and second directions define a first plane and having a portion of uniform height along a height axis that is orthogonal to the first plane. In one embodiment, each of the raised features in the set further has at least a first slanted surface that is oblique with respect to the first plane and oblique with respect to the height axis.

According to one aspect of the disclosure, there is provided an apparatus for surface contour imaging that can include an illumination apparatus energizable to direct one or more illumination patterns toward a surface position; a sensing apparatus to obtain one or more images of the surface position corresponding to the illumination patterns; and a calibration fixture detachably coupled to the apparatus, wherein the calibration fixture holds a calibration target at the surface position, the calibration target includes a set of three-dimensional (3D) features, each 3D feature having at least one planar surface and wherein the calibration fixture provides a adjustment that changes a distance between the calibration target and the sensing apparatus.

BRIEF DESCRIPTION OF THE DRAWINGS

The foregoing and other objects, features, and advantages of the invention will be apparent from the following more particular description of the embodiments of the invention, as illustrated in the accompanying drawings.

The elements of the drawings are not necessarily to scale relative to each other.

Figure 1:
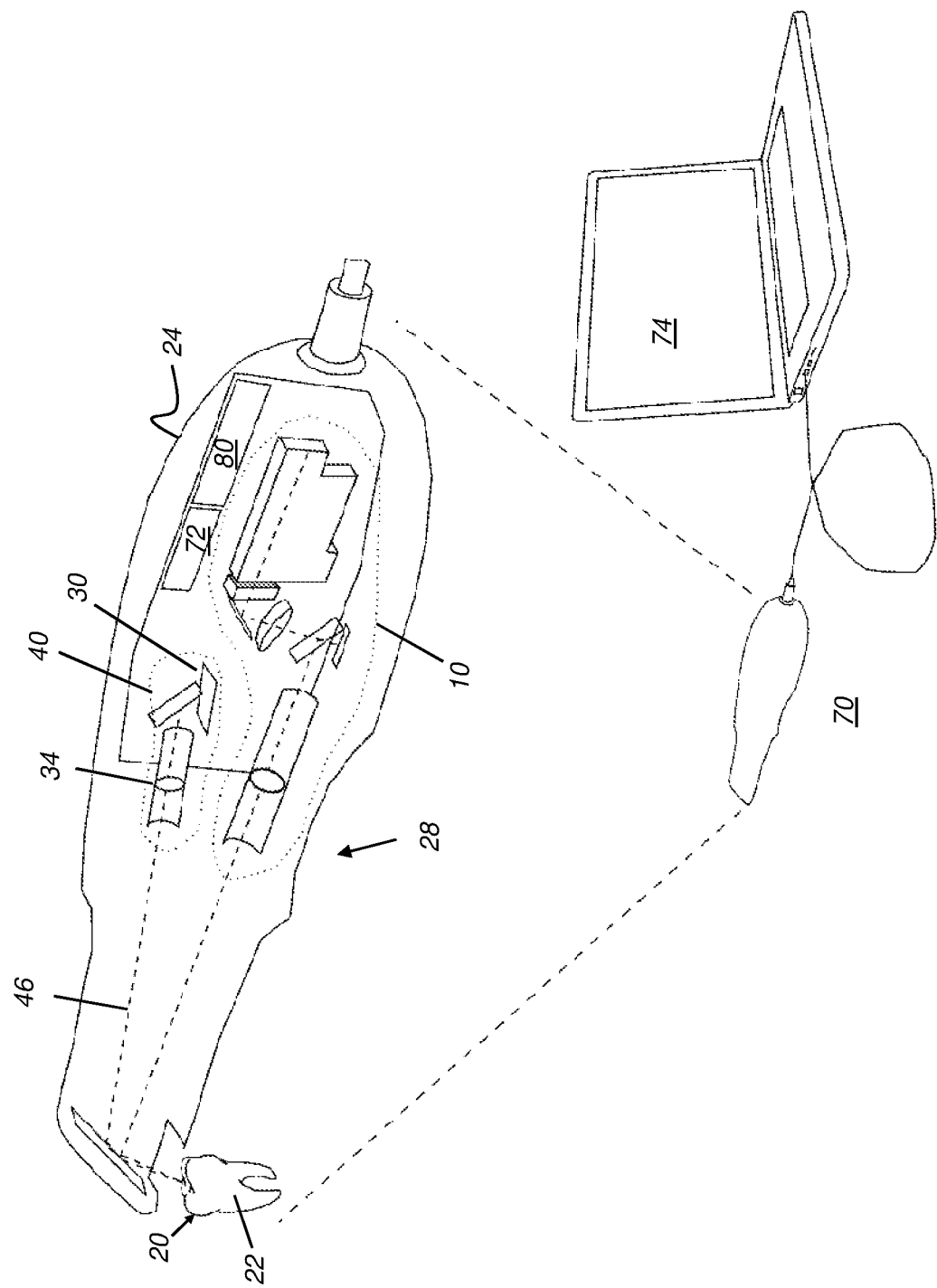
FIG. 1 is a schematic diagram that shows components of an imaging apparatus for surface contour imaging of a patient's teeth and related structures.

DESCRIPTION OF EXEMPLARY
EMBODIMENTS

The following is a description of exemplary embodiments, reference being made to the drawings in which the same reference numerals identify the same elements of structure in each of the several figures.

Where they are used, the terms "first", "second", and so on, do not necessarily denote any ordinal or priority relation, but may be used for more clearly distinguishing one element or time interval from another.

The term "exemplary" indicates that the description is used as an example, rather than implying that it is an ideal.

The term "in signal communication" as used in the application means that two or more devices and/or components are capable of communicating with each other via signals that travel over some type of signal path. Signal communication may be wired or wireless. The signals may be communication, power, data, or energy signals which may communicate information, power, and/or energy from a first device and/or component to a second device and/or component along a signal path between the first device and/or component and second device and/or component. The signal paths may include physical, electrical, magnetic, electromagnetic, optical, wired, and/or wireless connections between the first device and/or component and second device and/or component. The signal paths may also include additional devices and/or components between the first device and/or component and second device and/or component.

In the context of the present disclosure, the terms "pixel" and "voxel" may be used interchangeably to describe an individual digital image data element, that is, a single value representing a measured image signal intensity. Conventionally an individual digital image data element is referred to as a voxel for 3-dimensional or volume images and a pixel for 2-dimensional (2-D) images. For the purposes of the description herein, the terms voxel and pixel can generally be considered equivalent, describing an image elemental datum that is capable of having a range of numerical values. Voxels and pixels have attributes of both spatial location and image data code value.

The term "oblique", as used in the present disclosure, describes an angular relationship that is neither parallel nor normal, that is, other than an integer multiple of 90 degrees. As used in the present disclosure, two surfaces are considered to be oblique with respect to each other if they are offset from parallel or normal by at least about +/−10 degrees or more. Similarly, a line and a plane are considered to be oblique to each other if they are offset from parallel or normal by at least about +/−10 degrees or more.

"Patterned light" is used to indicate light that has a predetermined spatial pattern, such that the light has one or more features such as one or more discernable parallel lines, curves, a grid or checkerboard pattern, or other features having areas of light separated by areas without illumination. In the context of the present disclosure, the phrases "patterned light" and "structured light" are considered to be equivalent, both used to identify the light that is projected onto the head of the patient in order to derive contour image data.

In the context of the present disclosure, the terms "viewer", "operator", "end-user", and "user" are considered to be equivalent and refer to the viewing practitioner, technician, or other person who views and manipulates a contour image that is formed from a combination of multiple structured light images on a display monitor or who performs a calibration procedure on equipment that obtains a contour image.

The term "set", as used herein, refers to a non-empty set, as the concept of a collection of one or more elements or members of a set is widely understood in elementary mathematics. The term "subset", unless otherwise explicitly stated, is used herein to refer to a non-empty proper subset, that is, to a subset of the larger set, having one or more members. For a set S, a subset may comprise the complete set S. A "proper subset" of set S, however, is strictly contained in set S and excludes at least one member of set S.

A "viewer instruction", "operator instruction", or "operator command" can be obtained from explicit commands entered by the viewer or may be implicitly obtained or derived based on some other user action, such as making an equipment setting, for example. With respect to entries entered on an operator interface, such as an interface using a display monitor and keyboard, for example, the terms "command" and "instruction" may be used interchangeably to refer to an operator entry.

In the context of the present disclosure, a single projected line of light is considered a "one dimensional" pattern, since the line has an almost negligible width, such as when projected from a line laser, and has a length that is its predominant dimension. Two or more of such lines projected side by side, either simultaneously or in a scanned arrangement, provide a two-dimensional pattern.

The terms "3-D model", "point cloud", "3-D surface", and "mesh" may be used synonymously in the context of the present disclosure. The dense point cloud is formed using techniques familiar to those skilled in the volume imaging arts for forming a point cloud and relates generally to methods that identify, from the point cloud, vertex points corresponding to surface features. The dense point cloud is thus generated using the reconstructed contour data from one or more reflectance images. Dense point cloud information serves as the basis for a polygon model at high density for the teeth and gum surface.

Exemplary method and/or apparatus embodiments according to the application can provide a calibration target that can be used by the end-user (e.g., dentist, dental technician) of an intraoral scanner apparatus for end-user or in-house validation of calibration of the intraoral scanner apparatus and/or to provide data that can be used for calibration readjustment. Advantageously, calibration target embodiments can be easily fitted to an intraoral scanner. Further, use of calibration target embodiments do not require precision positioning of an intraoral scanner. Out-of-calibration errors that are detected can be corrected automatically by the scanning logic. Such scanning logic can be located in calibration target embodiments, intraoral scanners or a remote processor/computer in signal communication with one of the same.

FIG. 1 is a schematic diagram showing an imaging apparatus 70 that operates as a camera 24 for image capture as well as a scanner 28 for projecting and imaging to characterize surface contour using structured light patterns 46. A handheld imaging apparatus 70 uses a camera 24 for image acquisition for both contour scanning and image capture functions according to an embodiment of the present disclosure. A control logic processor 80, or other type of computer that may be part of camera 24, controls the operation of an illumination array 10 that generates the structured light and directs the light toward a surface position and controls operation of an imaging sensor array 30. Image data from surface 20, such as from a tooth 22, is obtained from imaging sensor array 30 and stored in a memory 72. Imaging sensor array 30 is part of a sensing apparatus 40 that includes an objective lens 34 and associated elements for acquiring image content. Control logic processor 80, in signal communication with camera 24 components that acquire the image, processes the received image data and stores the mapping in memory 72. The resulting image from memory 72 is then optionally rendered and displayed on a display 74. Memory 72 may also include a display buffer.

In structured light imaging, a pattern of lines is projected from illumination array 10 toward the surface of an object from a given angle. The projected pattern from the illuminated surface position is then viewed from another angle as a contour image, taking advantage of triangulation in order to analyze surface information based on the appearance of contour lines. Phase shifting, in which the projected pattern is incrementally shifted spatially for obtaining additional measurements at the new locations, is typically applied as part of structured light imaging, used in order to complete the contour mapping of the surface and to increase overall resolution in the contour image.

Figure 2:
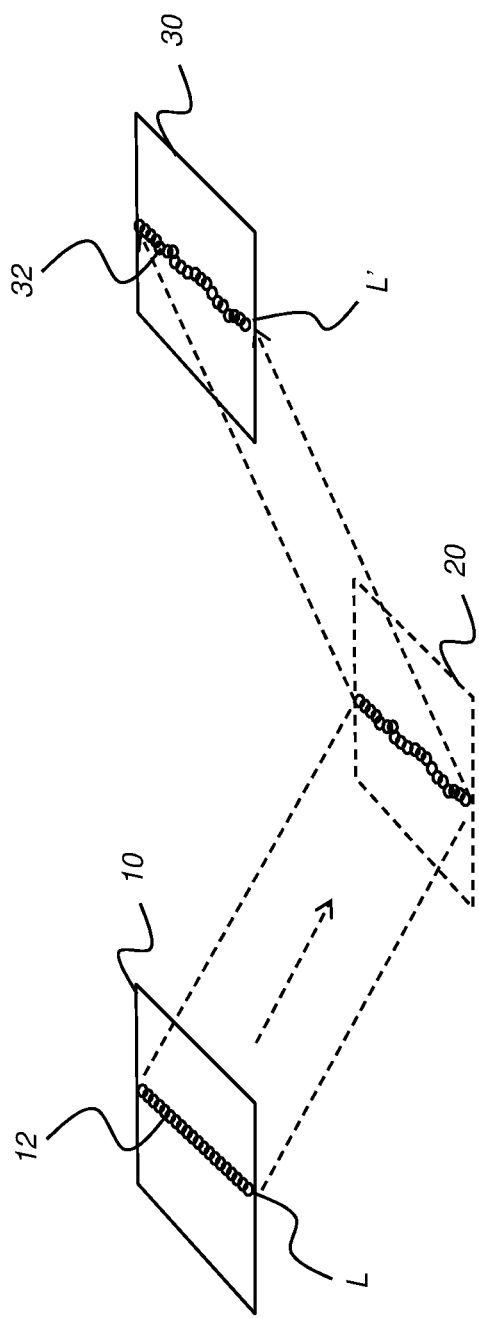
FIG. 2 shows schematically how patterned light is used for obtaining surface contour information using a handheld camera or other portable imaging device.

The schematic diagram of FIG. 2 shows, with the example of a single line of light L, how patterned light is used for obtaining surface contour information by a scanner using a handheld camera or other portable imaging device. A mapping is obtained as an illumination array 10 directs a pattern of light onto a surface 20 and a corresponding image of a line L' is formed on an imaging sensor array 30. Each pixel 32 on imaging sensor array 30 maps to a corresponding pixel 12 on illumination array 10 according to modulation by surface 20. Shifts in pixel position, as represented in FIG. 2, yield useful information about the contour of surface 20. It can be appreciated that the basic pattern shown in FIG. 2 can be implemented in a number of ways, using a variety of illumination sources and sequences and using one or more different types of sensor arrays 30. Illumination array 10 can utilize any of a number of types of arrays used for light modulation, such as a liquid crystal array or digital micromirror array, such as that provided using the Digital Light Processor or DLP device from Texas Instruments, Dallas, Tex. This type of spatial light modulator is used in the illumination path to change the light pattern as needed for the mapping sequence.

By projecting and capturing images that show structured light patterns that duplicate the arrangement shown in FIG. 1 multiple times, the image of the contour line on the camera simultaneously locates a number of surface points of the imaged object. This can speed the process of gathering many sample points, while the plane of light (and usually also the receiving camera) is laterally moved in order to "paint" some or all of the exterior surface of the object with the plane of light.

Multiple structured light patterns can be projected and analyzed together for a number of reasons, including to increase the density of lines for additional reconstructed points and to detect and/or correct incompatible line sequences. Use of multiple structured light patterns is described in commonly assigned U.S. Patent Application Publications No. 2013/0120532 and No. 2013/0120533, both entitled "3D INTRAORAL MEASUREMENTS USING OPTICAL MULTILINE METHOD" and incorporated herein in their entirety.

Figure 3:
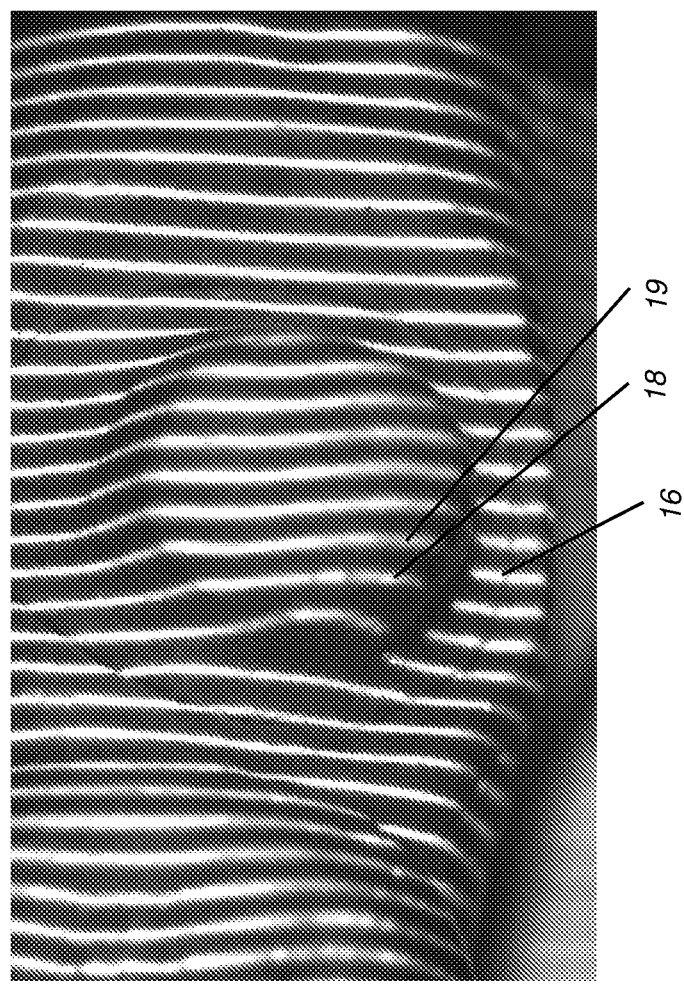
FIG. 3 shows an example of surface imaging using a pattern with multiple lines of light.

FIG. 3 shows surface imaging using a pattern with multiple lines of light. Incremental shifting of the line pattern and other techniques help to compensate for inaccuracies and confusion that can result from abrupt transitions along the surface, whereby it can be difficult to positively identify the segments that correspond to each projected line. In FIG. 3, for example, it can be difficult over portions of the surface to determine whether line segment 16 is from the same line of illumination as line segment 18 or adjacent line segment 19.

By knowing the instantaneous position of the camera and the instantaneous position of the line of light within an object-relative coordinate system when the image was acquired, a computer and software can use triangulation methods to compute the coordinates of numerous illuminated surface points. As the plane is moved to intersect eventually with some or all of the surface of the object, the coordinates of an increasing number of points are accumulated. As a result of this image acquisition, a point cloud of vertex points or vertices can be identified and used to represent the extent of a surface within a volume. The points in the point cloud then represent actual, measured points on the three dimensional surface of an object.

Calibration-related errors can be particularly troublesome, complicating and even compromising accurate construction of a point cloud that represents the surface contour.

In general, calibration is performed using a calibration target and requires some type of reference surface. In order to provide the needed quality, the overall precision of the calibration target must significantly exceed the desired precision of the scanner. As a rule of thumb, a precision of at least about 10 times better than the desired precision of the scanner is considered acceptable. For an intraoral scanner, achieving at least 50 micron precision thus means fabricating a calibration target that is accurate to within 5 microns. This can be a considerable challenge, even out of range for many manufacturing environments. To meet this requirement, either the calibration target must be highly accurate and precision-manufactured, or each scanner must be custom-calibrated to a particular target, requiring a unique reference file specific to the individual scanner.

It can be appreciated that the need for high precision, with very tight dimensional tolerancing, can result in relatively high cost of manufacture for the calibration target. Typically, the target is precision tooled, using a combination of costly cutting and etching tools, used in various orientations to shape the various surfaces and features of the calibration target. Even with high quality tooling and precision control, however, tool aging alone can present a considerable obstacle to maintaining the needed precision for calibration targets. Molding is a possible option, but requires considerable volume in order to justify the cost of mold preparation.

Where the needed precision is not achievable through machining or other methods, less desirable calibration methods are typically used. For example, the unique characterization of each manufactured calibration target, using a trusted scanner, is an option. This method, however, requires serial number identification of each target and linking a unique calibration file to each particular target, along with the necessary administrative overhead for tracking each target and its corresponding calibration file.

Exemplary method and/or apparatus embodiments according to the application address disadvantages of providing calibration tools using approaches inherently more robust to manufacturing differences over earlier processes. Certain exemplary embodiments according to the application can provide calibration in three dimensions over the field of view without requiring precision placement of the calibration target relative to the intraoral scanner. A prescribed arrangement or a preset arrangement of a set of multiple raised geometric features can be used to provide accurate dimensional measurements of the following:

(i) the corresponding points between two selected/consecutive rows of repeated/periodic geometric features (x-axis);
(ii) the corresponding points between two selected/consecutive rows of repeated/periodic geometric features (y-axis);
(iii) height distance between lower and upper known surfaces or surface portions (e.g., the base and the top) of the repeated/periodic geometric features;
(iv) the angle and/or position of the sides of the repeated/periodic geometric features.

Figure 4A:
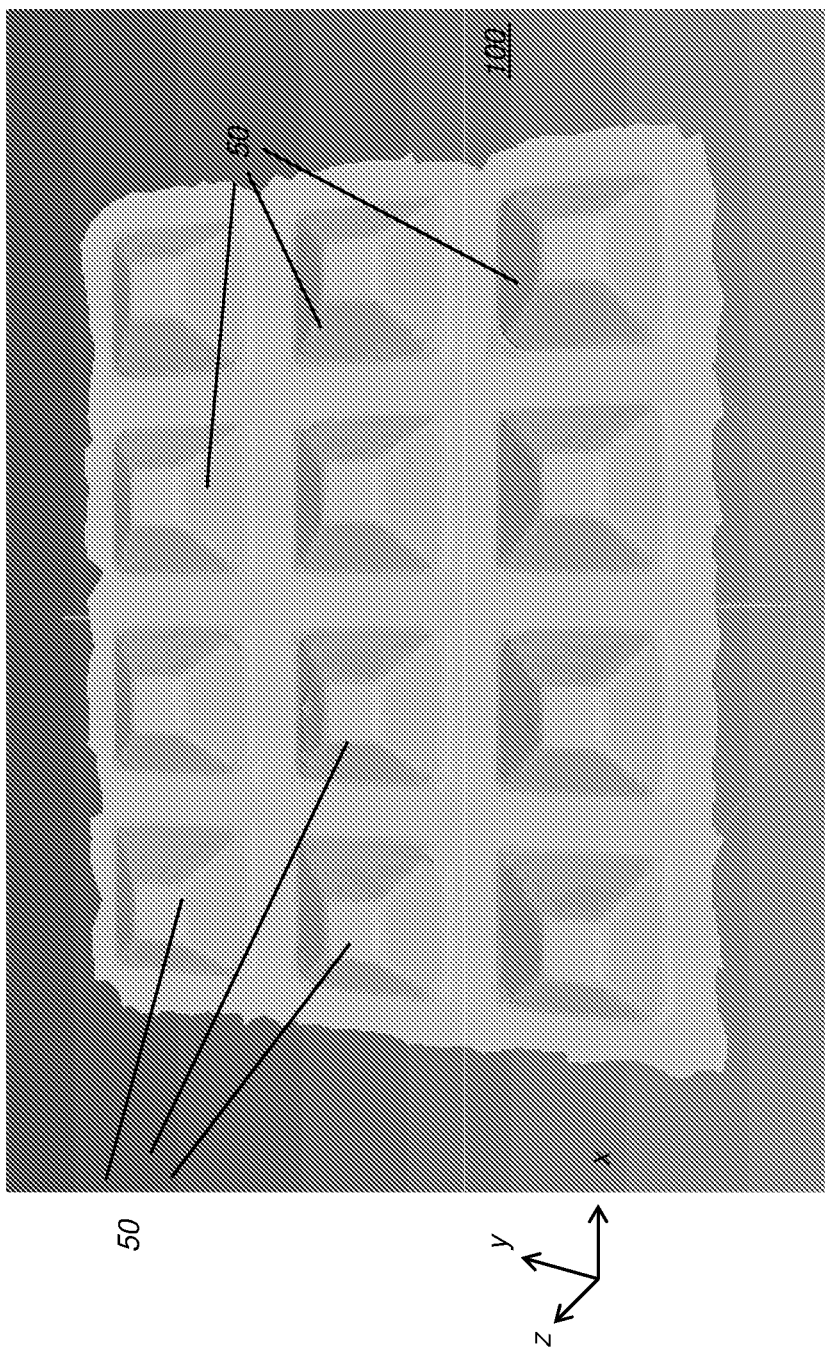
FIG. 4A is a perspective view showing an exemplary calibration target according to the present disclosure.

FIG. 4A is a perspective view showing an exemplary calibration target embodiment according to the present disclosure. As shown in FIG. 4A, an exemplary calibration target 100 has a number of truncated pyramids that serve as raised features 50 for exemplary calibration procedure embodiments. Raised features 50 are arranged in a prescribed known repeated arrangement at a surface of the exemplary calibration target 100. In some exemplary embodiments, the raised features 50 are arranged an array, with precise orthogonal spacing along x- and y-axes for obtaining calibration measurements.

Figure 4B:
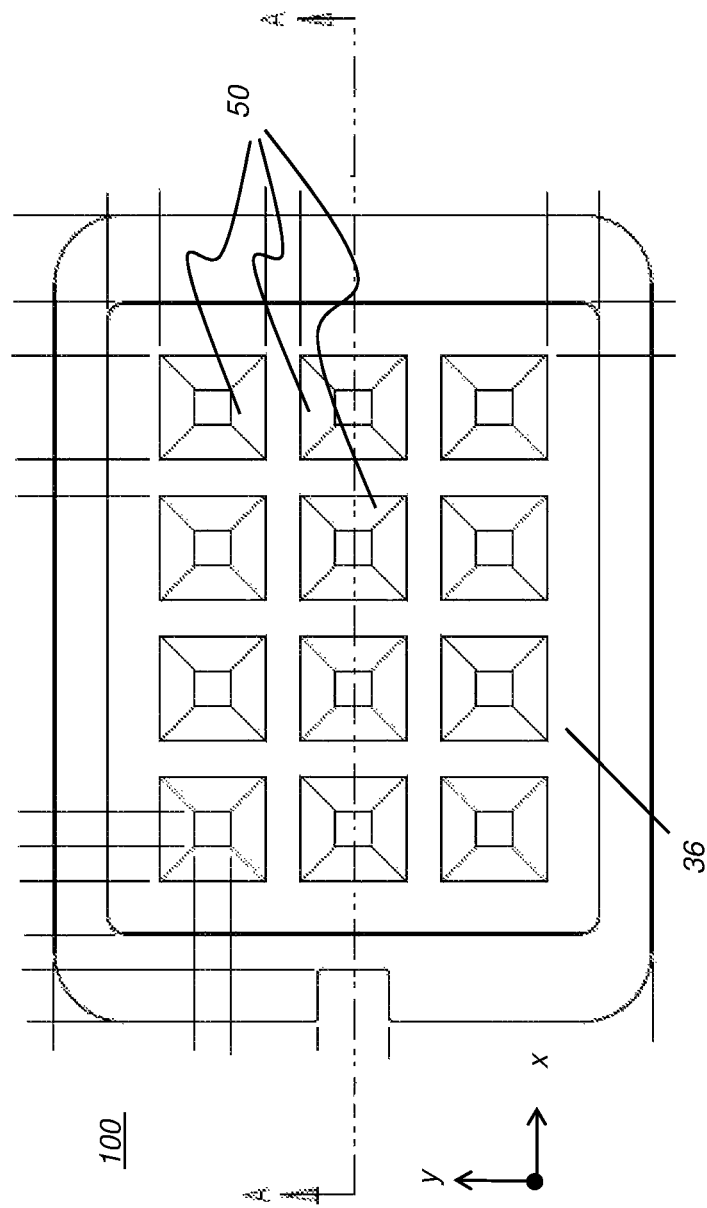
FIG. 4B is a plan view that shows an arrangement of exemplary periodic raised features of the calibration target.

FIG. 4B is a plan view that shows an exemplary periodic arrangement of geometric raised features 50 of calibration target 100. Pyramids that provide raised features 50 are of the same size and are evenly spaced apart in both x and y directions in the exemplary embodiment shown.

Figure 4C:
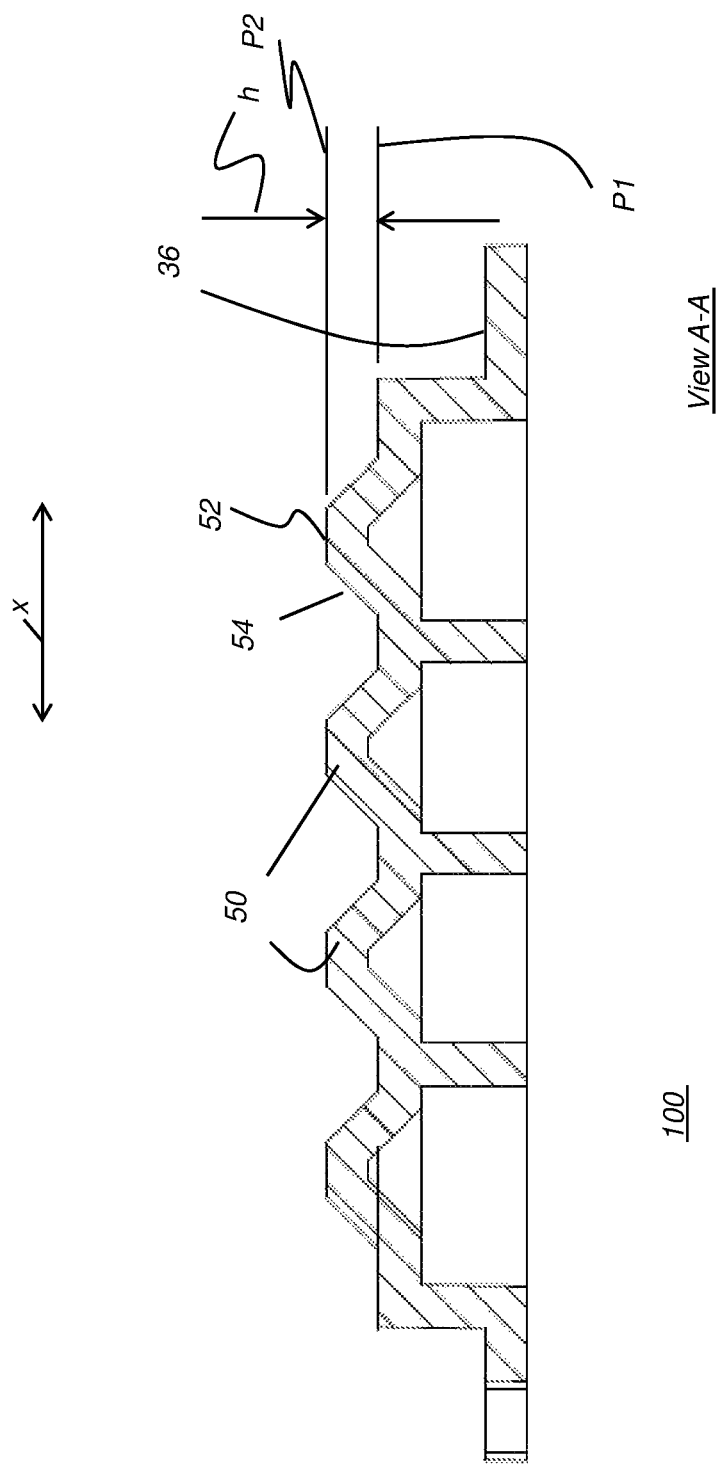
FIG. 4C is a cross-sectional side view of the calibration target of FIG. 4B.

FIG. 4C is a cross-sectional side view of the calibration target 100 taken along markers A-A in FIG. 4B. FIG. 4B shows the structure of truncated pyramids that provide raised features 50 and a height h that is measured from the base of raised feature 50 to its top surface, as shown. Height h can be considered the distance between parallel planes P1 and P2, wherein the bases of raised features 50 be beneath, extend along, or lie in the x-y plane, plane P1 and the top surfaces 52 of raised features 50 lie in plane P2, parallel to the x-y plane. An optional rim 36 can be provided peripheral to the array of raised features 50.

Figure 4D:
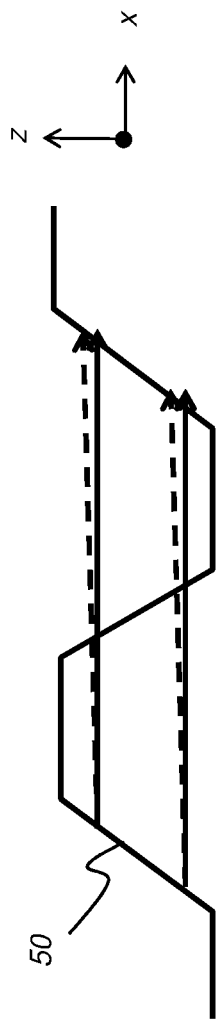
FIG. 4D is a schematic diagram showing exemplary periodicity correspondence measurements in the x-y plane using the calibration target.

Given the structure of calibration target 100 shown in FIGS. 4A-4C, FIGS. 4D-4F then show the different measurements that are taken with respect to calibration quantities in items (i)-(iv) listed above. FIG. 4D is a schematic diagram showing exemplary periodicity correspondence measurements in the x-y plane using the calibration target. Dashed lines show one possible error related to 2-D coordinates in the x-y plane, as noted in (i-ii) above. Periodic correspondence between similar points on raised features 50 provides accurate 2-D coordinate measurement in the x-y plane. Errors in measurement can indicate the need for calibration, in order to reduce the likelihood of distortion from the scan.

Figure 4E:
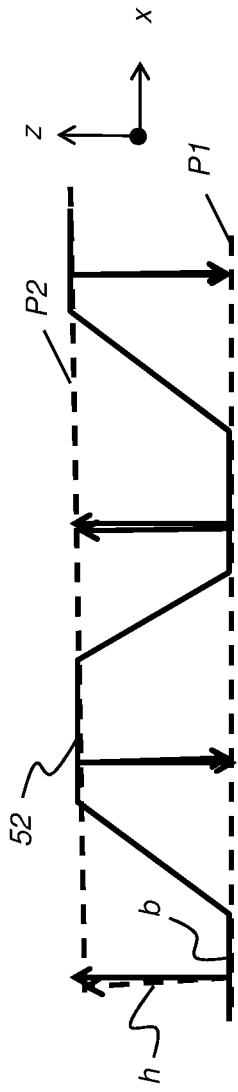
FIG. 4E is a schematic diagram showing exemplary height correspondence measurements using the calibration target.

FIG. 4E is a schematic diagram showing exemplary height h correspondence measurements using calibration target 100. Height h indicates measured distance between a first reference lower surface and a second reference upper surface relative to the raised features 50 (e.g., the base b of the truncated pyramid in plane P1 and its upper surface 52 in plane P2). Errors in height h measurement can indicate adjustments needed to calibration.

Figure 4F:
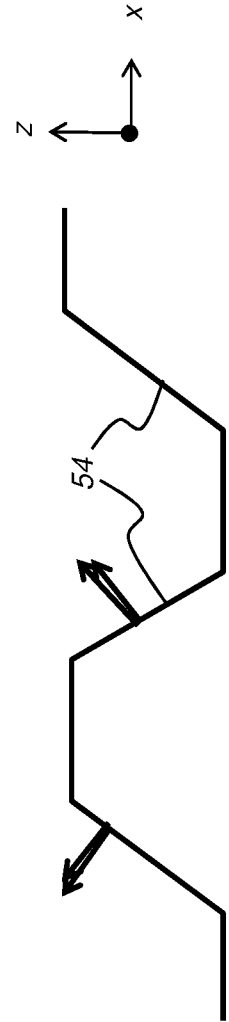
FIG. 4F is a schematic diagram showing exemplary measurements of oblique correspondence using the calibration target.

FIG. 4F is a schematic diagram showing exemplary measurements of oblique correspondence using calibration target 100. Quantities (i-iii) control the object scale along the x,y,z axes independently. Oblique correspondence relate axes to each other and help to show that axes x, y, and z are orthogonal. It can be highly useful to measure oblique correspondence that relates (x-z) and (x-y) directions to help the overall stability of the calibration method.

Oblique correspondences are characterized using the local surface normal. There are a number of ways of computing surface normals: for point clouds, the eigenvector of the smallest eigenvalue of the correlation matrix from a neighborhood of the points can be used (see R. B. Rusu, PhD dissertation, "Semantic 3D Object Maps for Everyday Manipulation in Human Living Environments", 2009, Institut für Informatik, der Technischen Universitat Munchen, chapter 4, pages 45-49 for an example). For a mesh, a weighted sum of surrounding triangle normals can be used.

It can be appreciated that oblique correspondence of slopes 54 can be measured in a number of ways. The same coordinate points that are used to validate periodic x-y plane measurements from one pyramid or other raised feature 50 to the next can also be used for measuring oblique correspondence between adjacent surfaces 54, wherein adjacent surfaces 54 can be, for example, either opposite surfaces of the same pyramid or facing surfaces of neighboring pyramids or other feature 50.

According to certain exemplary embodiments according to the application, calibration target 100 comprises a set of raised features, uniformly spaced with respect to the x-y plane and further having at least a first slanted surface that is oblique with respect to the x-y plane and oblique with respect to the height axis that is orthogonal to the x-y plane. In the examples shown herein, raised features 50 are shown as uniformly spaced features, having planar surfaces that can be visible in a single image capture, with height distances and orthogonal distances in the x-y plane that can be readily determined with relatively high accuracy. Oblique surfaces and their normals can also be readily computed, providing additional feature information including angular features with respect to the height or the x-y plane. Truncated pyramids are one suitable type of raised feature that can be used. It can be appreciated, however, that other types of features can alternately be employed, including truncated cones, prismatic shapes, truncated tetrahedral shapes, and the like.

Figure 4G:
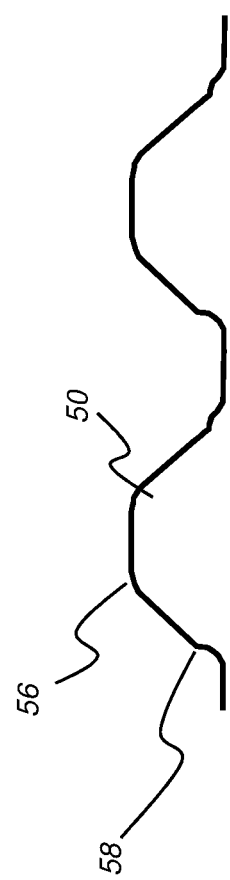
FIG. 4G is a schematic diagram showing exemplary periodic defects that can be acceptable when using the calibration target.

Advantageously, certain exemplary embodiments of the present disclosure allow use of a calibration target that can have fabrication defects, provided that the defects are themselves repeated or periodic. FIG. 4G is a schematic diagram showing, in cross section, exemplary periodic defects of truncated pyramids or other raised features 50 that can be acceptable when using the calibration target. These can include, for example, edge rounding 56, undercuts 58, and other surface irregularities, such as from molding or machining processes.

Figure 5A:
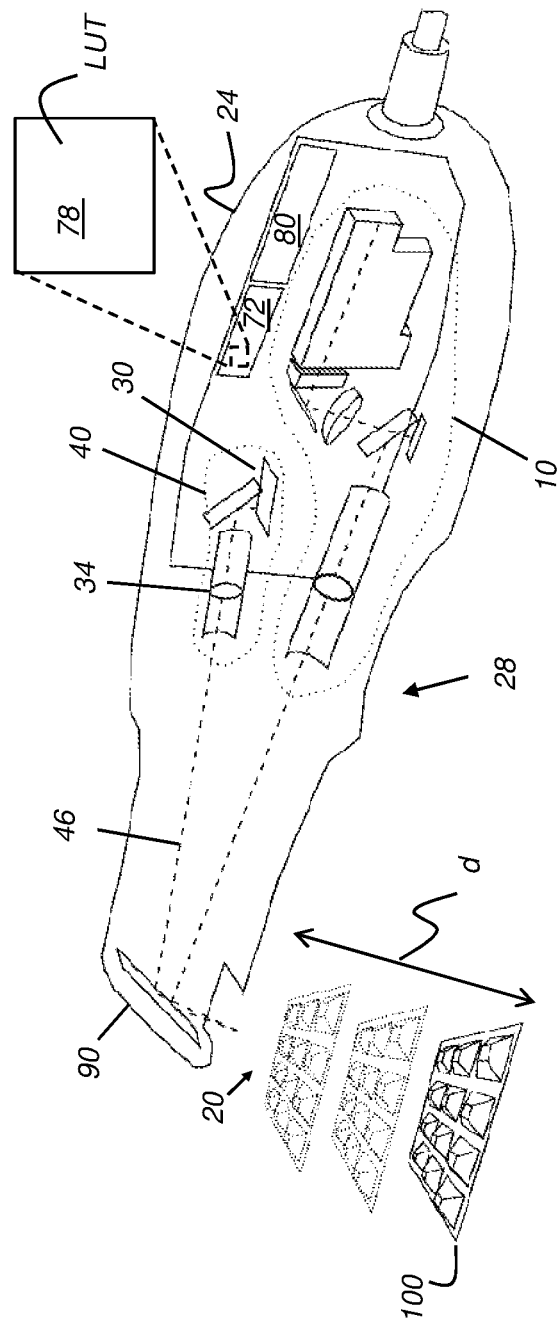
FIG. 5A is a schematic diagram that shows use of the calibration target with an imaging apparatus.

FIG. 5A is a schematic diagram that shows use of the calibration target with imaging apparatus 70. Calibration data is stored in memory 72, such as in a Look-Up Table (LUT) 78. To perform calibration, camera 24 acquires multiple images of calibration target 100 at set of distances d. Three different distances are shown by way of example in FIG. 5A; however, it should be noted that maintaining specific distances d is not required for calibration. In addition, rotation or translation of calibration target 100 does not affect calibration processes in at least one exemplary embodiment. The orientation of target 100 shown in FIG. 5A allows acquisition of dimension data from the full 3-D reconstruction volume, as defined by the field of view and the depth of field of the optical system. Control logic processor 80 then performs the necessary calculations in order to determine calibration accuracy and identify where adjustment is needed. Control logic processor 80 then updates LUT 78 or other suitable data structure according to the acquired and calculated calibration data.

In practice, calibration for scanner 28 operation typically requires only small adjustments to compensate for drift, component aging, and other factors. 3-D scanner calibration is based on a number of geometric and optical parameters. Exemplary measurable parameters that affect calibration include the angle between the projection axis and the camera axis, the magnification provided by the projection optical system or by the camera optical system, and pixel size. These parameters help to model the optical system to allow adjustment for measured values that relate to measurements (i)-(iv) listed earlier. Where the optical system is accurately modeled, corrective adjustments can be made according to the measured values. It should be noted, however, that modeling of the optical system may not identify all parameters; for example, spherical aberration may not be included in the model.

According to an embodiment of the present disclosure, one or more 3-D Look-Up Tables (LUTs) or other suitable data structures can be used to integrate any of the measured and the missing parts of the calibration model and provide the needed vehicle for making adjustments according to measured values. A 3-D LUT is a grid that applies an appropriate displacement (dx, dy, dz) to input points within the full x,y,z image reconstruction volume. The grid is controlled by control points. A point that lies between control points is assigned an interpolated displacement value, such as using a tri-linear interpolation between neighboring control points. According to an alternate embodiment of the present disclosure, calibration can be performed without control points, using the entire set of calibration parameters.

Figure 5B:
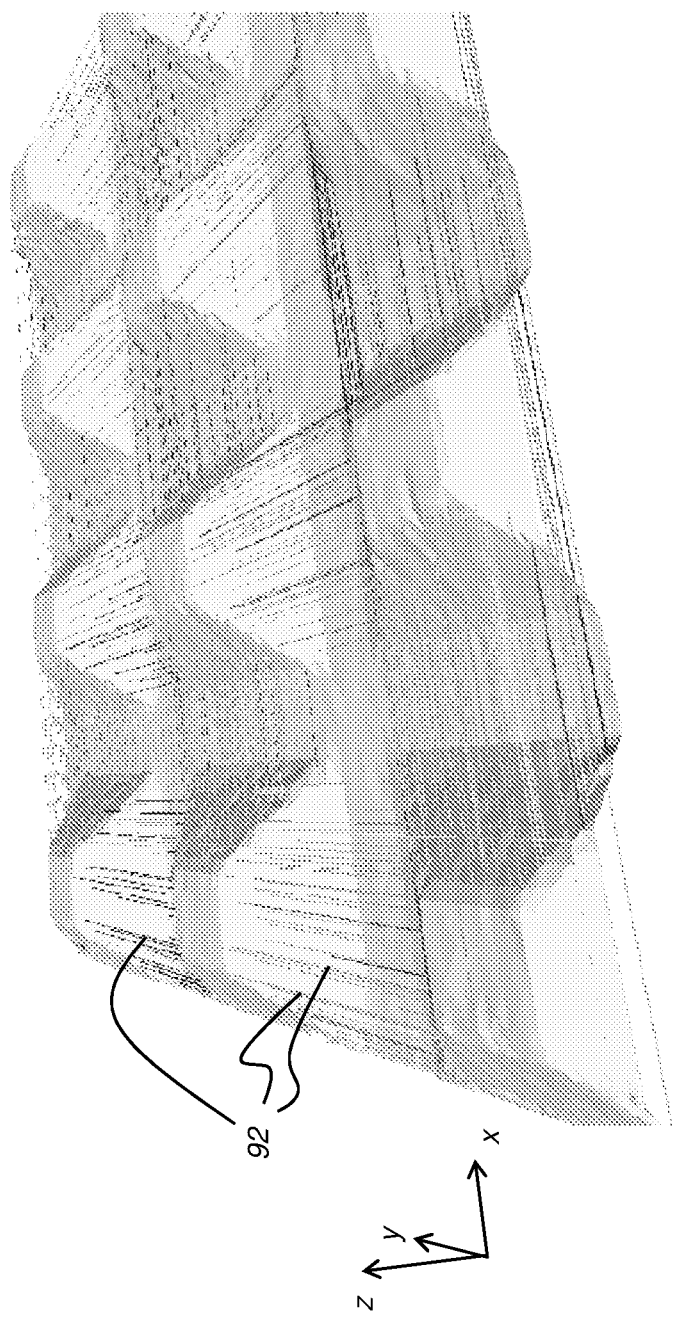
FIG. 5B is a perspective view showing representative measured periodic correspondence results relative to the x-y plane.

By way of example, FIG. 5B is a perspective view with lines 92 showing representative measured periodic correspondence results relative to the x-y plane. Each measurement can be checked against stored data for accuracy within desired tolerances. Errors requiring adjustment of an TO scanner being tested or calibrated, can be quickly identified and appropriate adjustments applied, such as by updates to LUT 78 (FIG. 5A).

Figure 5C:
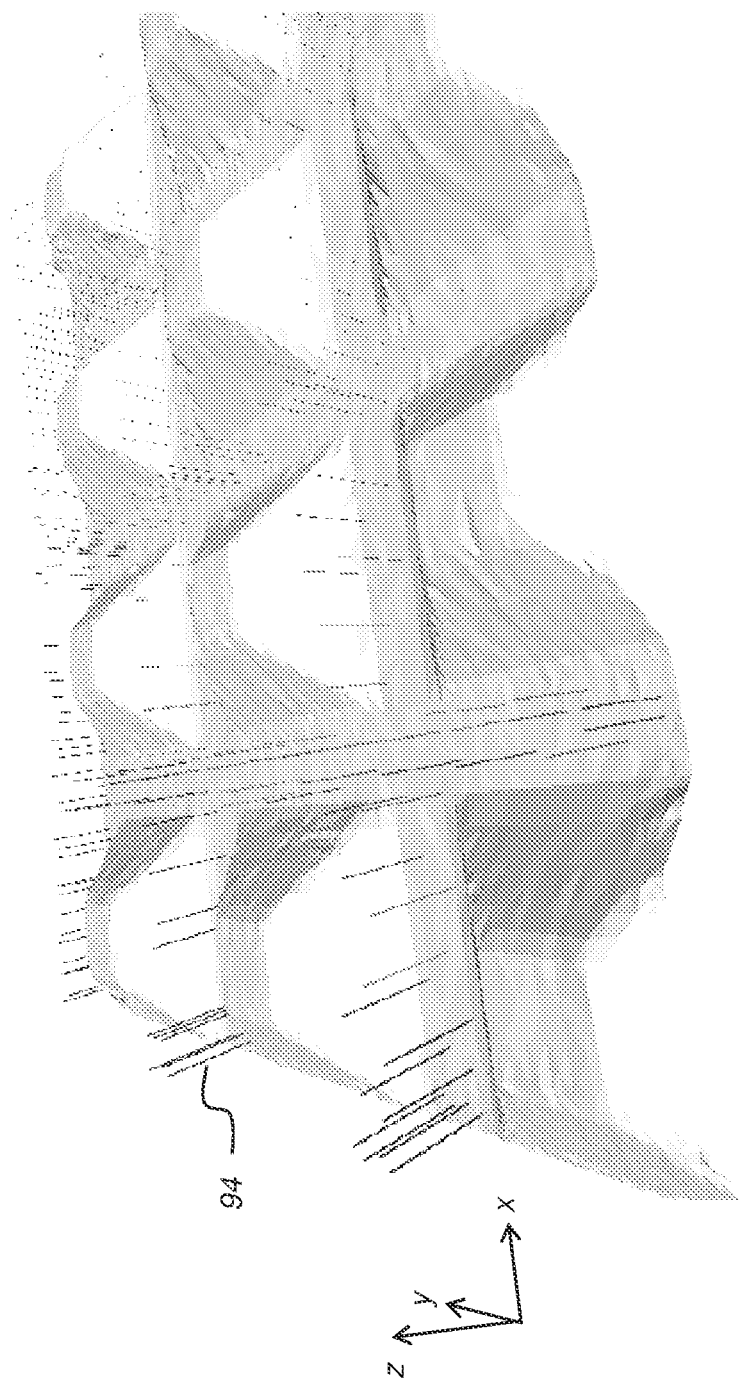
FIG. 5C is a perspective view showing representative measured height correspondences along dimension z.

FIG. 5C is a perspective view with lines 94 showing representative height correspondences along dimension z. Each measurement can be checked against stored data for accuracy within desired tolerances. Errors requiring adjustment of an TO scanner being tested or calibrated, can be quickly identified and appropriate adjustments applied, such as by updates to LUT 78 (FIG. 5A).

Figure 5D:
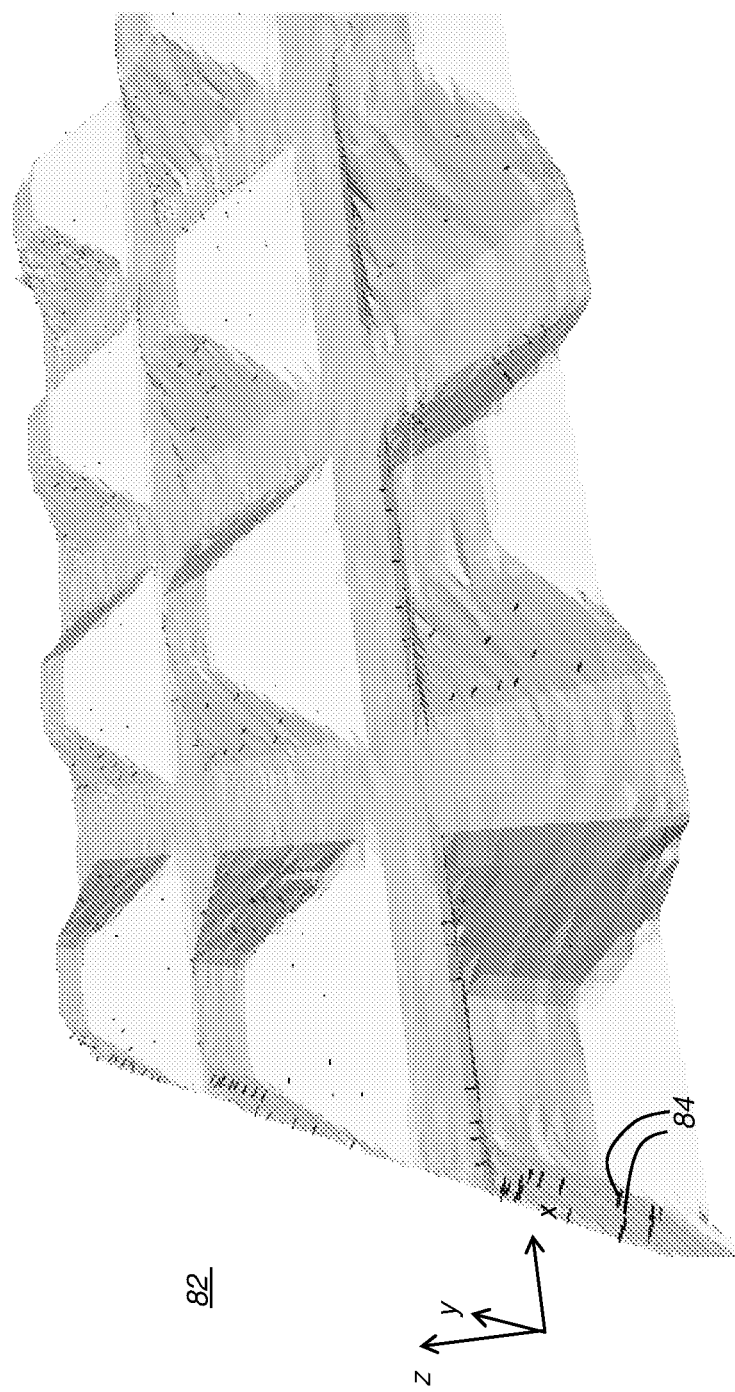
FIG. 5D is a perspective view showing oblique normals to the scanned target.

FIG. 5D is a perspective view showing oblique normals 84 generated by the control logic from images 82 acquired from the calibration target 100. Color-coded or grayscale lines can be used, as shown, to highlight representative measured results for oblique correspondence of calibration target measurements. Each measurement can be checked against stored data for accuracy within desired tolerances. Errors requiring adjustment of an TO scanner being tested or calibrated, can be quickly identified and appropriate adjustments applied, such as by updates to LUT 78 (FIG. 5A).

Advantageously, with the design of certain exemplary calibration targets as described herein, the full surface of calibration target embodiment can be imaged from a range of angles (e.g., distance d in FIG. 5A). Using an arrangement of prescribed positioned raised features of a calibration target embodiment, for example raised features 50 as periodic truncated pyramids having sides of the pyramid features at generally 45-degree angles relative to planes P1 and P2, the full set of surfaces 52 and 52 (FIG. 4C) can be observed from a single camera 24 angle.

In order to acquire measurements from calibration target 100 in a controlled manner, camera 24 or other scanning device is not highly dependent on precision positioning of the target 100. However, some measure of control over the positioning of target 100 is desirable, including the ability to acquire images of the target at a number of difference distance d settings, for example as described with reference to FIG. 5A.

Figure 6A:
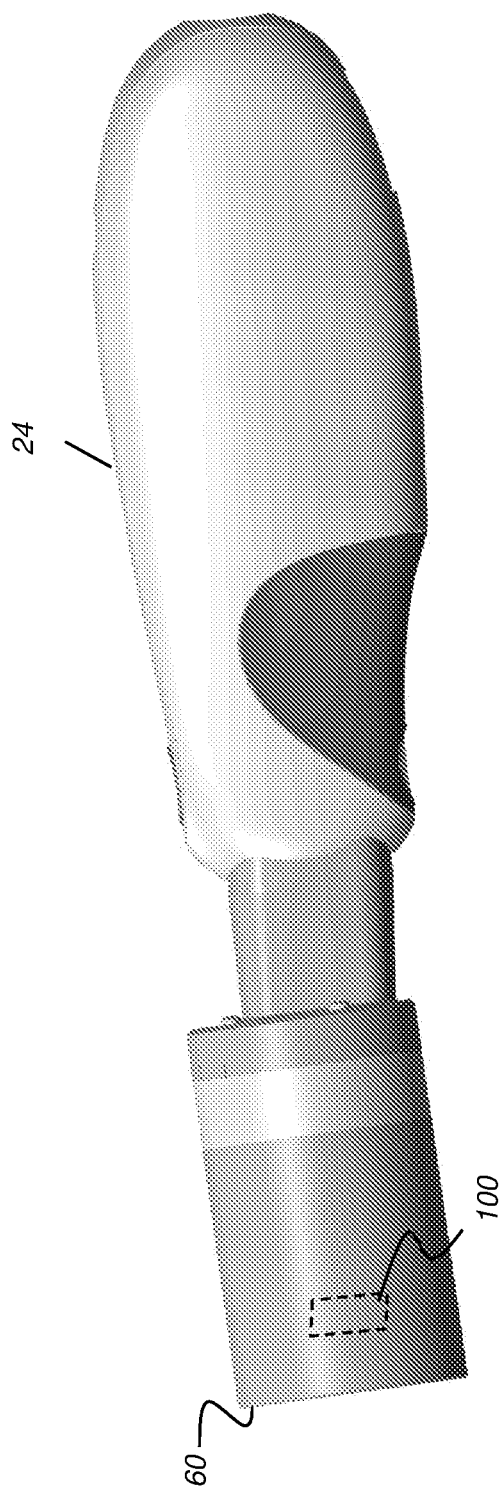
FIG. 6A is a perspective view that shows an intraoral scanning apparatus coupled to a calibration target fixture according to an embodiment of the present disclosure.

FIG. 6A is a perspective view that shows camera 24 providing an intraoral scanning apparatus, with a portion of a scanning tip 90 (FIG. 5A) removed, coupled to a calibration target fixture 60 according to an embodiment of the present disclosure. Alternative exemplary calibration target fixture embodiments can directly attach to an exterior of the handheld imaging apparatus 70, preferably in a prescribed or selected 3D spatial orientation. As shown in FIG. 6A, calibration target fixture 60 serves as a convenient holder or housing for automatic and adjustable positioning of the calibration target 100. This coupling provides a predetermined alignment and positioning relationship of target 100 (shown in dashed outline) with the scanning illumination and imaging components of the scanning apparatus of camera 24.

Figure 6B:
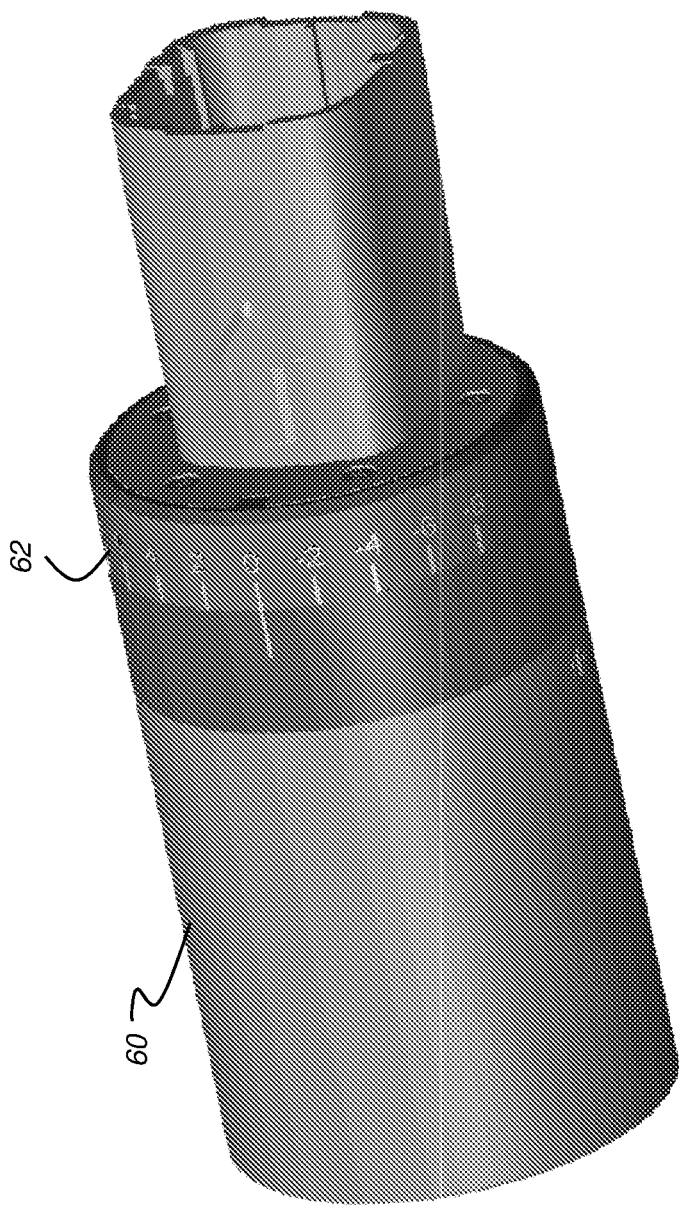
FIG. 6B is a perspective view that shows the calibration target fixture having depth adjustment.

FIG. 6B is a perspective view that shows the calibration target fixture 60 removed from camera 24. A depth adjustment collar 62 is rotatable to allow adjustment of target depth. Depth adjustment collar 62 can have any of a number of positions to cover a range of depths. The adjustment mechanism can be continuous, allowing adjustment to any depth over the range, or may be indexed to increment distance d to specific values. Generally, multiple values of d are used for acquiring contour image content, described in more detail subsequently.

Figure 6C:
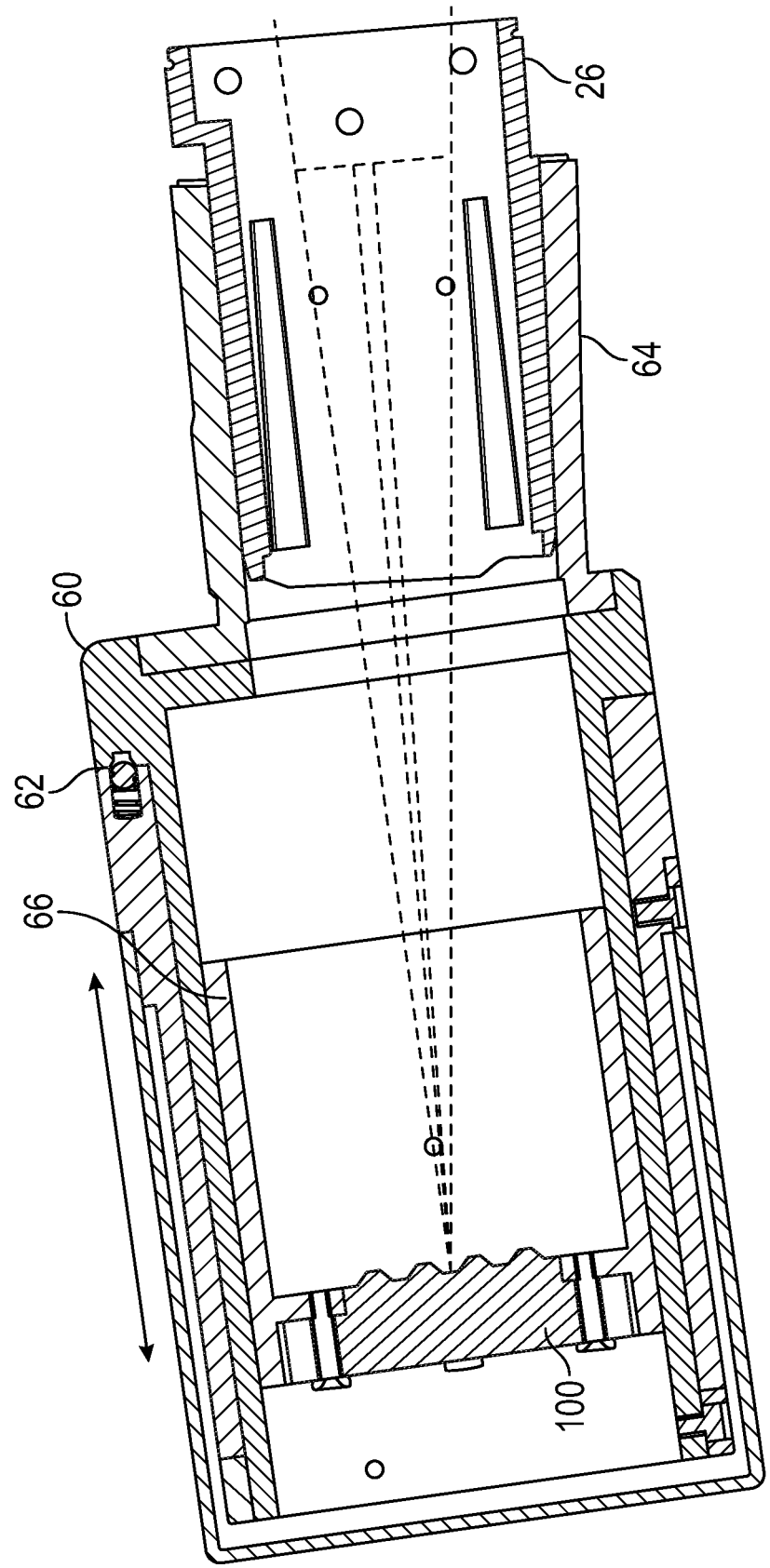
FIG. 6C is a cutaway side view showing the positioning of the scan head and target within the calibration target fixture.

FIG. 6C is a cutaway side view showing the positioning of a scan head 26 and target 100 within the calibration target fixture 60. Scan head 26 can fit into a sleeve 64 and can be keyed to fit only in a preferred or selected orientation, for example. Keying can be provided by a combination of slots and notch elements or other guidance elements in sleeve 64 that facilitate seating of target fixture 60 against scan head 26. Calibration target 100 can be mounted within a movable member 66 that is capable of being moved to various positions along an axis. Adjustment of collar 62 allows the positioning of calibration target 100 to a selected or desired distance from scan head 26.

With the arrangement shown in FIGS. 6A-6C, target fixture 60 enables the end-user to perform calibration measurements in a controlled environment, helping to eliminate variables that can complicate calibration steps such as target positioning and alignment and image acquisition, for example. Because calibration target 100 can be housed within target fixture 60, target 100 offers a measure of protection from exposure to dust or airborne contaminants and to UV light and other radiant energy that can tend to discolor the target 100 surface over time.

Figure 7:
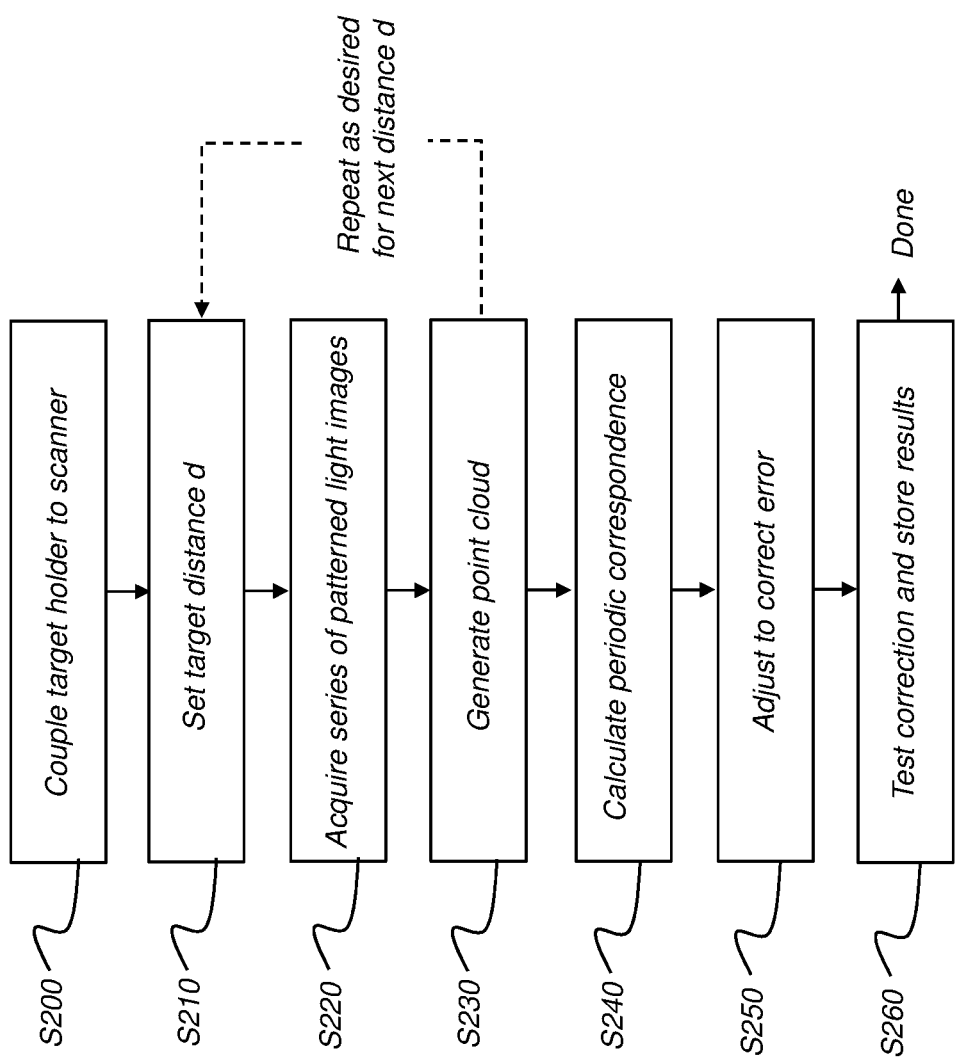
FIG. 7 is a logic flow diagram that shows exemplary processes for scanner calibration using an exemplary calibration target and an exemplary target fixture according to an embodiment of the present disclosure.

Referring to FIG. 7, a logic flow diagram that shows an exemplary method for IO scanner calibration according to embodiments of the application will now be described. As shown in FIG. 7, methods for IO scanner calibration will be described using and can be implemented by embodiments of calibration target and target fixtures shown in FIGS. 4A-5A and FIGS. 6A-6C; however, the method of FIG. 7 is not intended to be limited thereby.

As shown in FIG. 7, in a target coupling block S200, the operator who is performing calibration removes scanning tip 90 (FIG. 5A) and couples target fixture 60 against scan head 26, as described previously with reference to FIG. 6A. In a distance setting block S210, the operator adjusts the distance d between the target and the scanning head, as described previously with reference to FIG. 5A. In an image acquisition block S220, the operator acquires the series of patterned light images needed at one or more operator-selectable distances d. This sequence can be initiated by an operator instruction entry at display 74 (FIG. 5A) or on camera 24 itself.

Continuing with the process of FIG. 7, a point cloud generation block S230 takes the acquired images from block S220 and uses the image data in order to generate surface contour information, typically in the form of a point cloud, or from a mesh developed from a point cloud. Blocks S210, S220, and S230 can then be repeated as many times as necessary, along with fixture 60 adjustment, in order to obtain data at two or more target distances d. According to an embodiment of the present disclosure, measurements are acquired at three different distances d; measurement at fewer or more than three distances d may alternately be useful.

In a calculation block S240 in the FIG. 7 procedure, measurement calculations are performed for determining how closely the calibration readings satisfy the correspondence (e.g., correspondence between selected raised features among the arranged plurality of raised features 50) required for a well-calibrated device. As a result of block S240 calculations, an adjustment block S250 then provides adjustment values for calibration, such as by providing values that update calibration LUT 78 as shown in FIG. 5A, for example.

In certain exemplary embodiments, calculation block S240 can use a cost function for providing and testing adjusted calibration values. The cost function can use values such as the sum of squared residuals between measured correspondence values and ideal correspondence measurements, for example. However, other surface comparison evaluation functions can be used.

After adjustment is completed, a testing, display, and storage block S260 executes, validating the calibration adjustment settings and, optionally, displaying calibration results to the user and storing the results in memory 72. Imaging apparatus 70 then indicates that calibration is complete, such as by displaying a message, flashing an indicator on camera 24, or providing an audible prompt, for example. Calibration results obtained from this sequence can alternately be transferred to a separate computer using the internet or other data transfer facility.

According to an exemplary embodiment of the present disclosure, an animation is provided on display 74 (FIG. 1) to guide the end-user through the calibration process. Feedback can indicate which surfaces have been acquired prior to calibration calculations. Display 74 may also provide visual indication of calibration adjustments that have been made, including adjustments relative to the surface of calibration target 100, as shown in FIGS. 5B-5D, for example.

Correspondence Processing

Correspondence calculation and adjustment, as executed in blocks S240 and S250 of the FIG. 7 sequence, can be executed using a number of different approaches. An exemplary embodiment of the present disclosure can perform this procedure using a type of iterative closest points (ICP) processing, a general approach that is familiar to those skilled in the 3-D image reconstruction arts and particularly adapted to finding correspondence between a rigid reference or target point cloud and a movable or measured point cloud.

Based on an initial starting point, termed a "guess" but based on predictable parameters, such as knowing that the calibration target is sufficiently constrained to be within a range of angles and at a given distance, for example. The algorithm iteratively updates a rigid transform for matching the measured data to the fixed reference. The algorithm iteratively revises the transform, a combination of translation and rotation, in order to reduce or minimize the distance from the source to the reference point cloud and completes when either a predefined maximum number of iterations is reached or the relative variation of the distance to the target rigid point cloud between two consecutive iterations drops below a predetermined threshold.

Using ICP, the update of the rigid transform usually involves a sequence of steps such as the following:
   (i) selecting a subset of points from the moving point cloud;

(ii) computing point movement using the current rigid transform;
(iii) determining correspondences, each correspondence being a pair of one moving point, and the closest neighbor to that moved point, identified from the target rigid point cloud;
(iv) estimating an updated rigid transform that minimizes the distance between the correspondences; and
(v) applying the updated rigid transform to the current rigid transform.

Distance calculation can be done in various ways, including using the quadratic sum between points or between a point and its orthogonal distance to a tangent surface, for example.

A number of types of correspondences can be defined using the ICP algorithm in multiple configurations where the moving and target point clouds both represent the same reconstructed 3D surface of the periodic targets at a depth d. The use of the ICP algorithm is robust to small errors in the initial guess, constrained on the order of 10 degrees rotation and/or 0.5 mm translation error as provided by the calibration target holder. Thus, mechanical requirements for positioning the calibration target are not highly demanding; precise alignment of the periodic targets relative to the scanner is not required using this method.

For subsequent description of processing for LUT update, a number of variables are defined, given as follows:
Th—horizontal translation along the x-axis equal to the period px of the periodic targets;
Tv—vertical translation along the y-axis equal to the period py of the periodic targets; and
Td—translation along the z-axis equal to the height of the truncated periodic targets.

For computing horizontal correspondences (along x axis): From the initial guess $T_h$, apply the ICP algorithm to obtain a final rigid transform. Once more, use steps (i-ii-iii) from the ICP algorithm steps listed above to determine horizontal correspondences using the final rigid transform. The set of horizontal correspondences is termed $(h_{1,i}, h_{2,i})_i$.

For computing vertical correspondences (along y axis): From the initial guess $T_v$, apply the ICP algorithm to obtain a final rigid transform. Once more, use steps (i-ii-iii) from the ICP algorithm steps listed above to determine vertical correspondences using the final rigid transform. The set of vertical correspondences is termed $(v_{1,j}, v_{2,j})_j$.

For computing depth correspondences (along z axis): Define a planar surface with a normal along the z-axis. Determine one initial guess and use the ICP algorithm to obtain a first final rigid transform corresponding to the horizontal plane at the base of the periodic truncated pyramids or other raised features. Repeat this processing with a second initial guess and use ICP to obtain a second final rigid transform corresponding to the horizontal plane made of the flat surface of the truncated targets. The first and second rigid transforms move the planar surface into first and second planes. Height correspondences are determined from pairs, each pair having one random sample from the first plane $(d_{1,k})$ and an orthogonal projection onto the second plane $(d_{2,k})$. Pairs of random samples from the second plane and the orthogonal projections onto the first plane may also be added. The set of depth correspondences is termed $(d_{1,k}, d_{2,k})_k$.

For computing oblique correspondences: From the height correspondences, all points from the 3D surface close to either the first or the second plane are rejected using a predetermined threshold, isolating only the oblique surfaces of the 3D surface. Oblique correspondences consist of a randomly sampled 3D location $(o_l)$ on the remaining oblique surface and the local surface normal $(n_l)$ at that sampled 3D location. The set of oblique correspondences is termed $(o_l, n_l)_l$.

LUT Update Processing

According to an exemplary embodiment of the present disclosure, the LUT update can be computed from the set of correspondences by reducing or minimizing a cost function. For each 3D surface taken at depth d, a set of horizontal, vertical, depth and oblique correspondences can be defined. These correspondences can then be combined together in the cost function given below. Each 3D surface brings correspondences that sample the LUT at different depths and bring correction uniformly in the LUT. For improved readability, index (d) is omitted from the correspondences.

The transform $T_{LUT}(p)$ applies a displacement of point p (in the scanner coordinate system) using tri-linear interpolation of the displacements from the control points in the LUT table. Transformation $T^{(d)}_{target}(p)$ aligns the (x,y,z) axes of the periodic target at depth d onto the (x',y',z') axes from the camera coordinate system. Angle $\vartheta$ is the angle of the oblique surface of the periodic targets with the z-axis. Coefficients $c_1$, $c_2$, $c_3$ are pre-determined to balance the contributions of the terms of the cost function. The LUT and $T^{(d)}_{target}$ for each depth are obtained through reducing or minimization, such as that provided by the following:

$$\min_{T_{LUT}, T^{(d)}_{Target}} \sum_d \left( \begin{array}{l} \sum_i \|T_h T^{(d)}_{target} T_{LUT} h_{i,1} - T^{(d)}_{target} T_{LUT} h_{i,2}\|^2 + \\ c_1 \sum_j \|T_v T^{(d)}_{target} T_{LUT} v_{j,1} - T^{(d)}_{target} T_{LUT} v_{j,2}\|^2 + \\ c_2 \sum_k \|T_d T^{(d)}_{target} T_{LUT} d_{k,1} - T^{(d)}_{target} T_{LUT} d_{k,2}\|^2 + \\ c_3 \sum_l \|\cos(JT^{(d)}_{target} JT_{LUT}(o_l) n_l), z) - \cos(\vartheta)\|^2 \end{array} \right)$$

Where JT(n) represents the transformation of vector n by matrix T. JT is the Jacobian of the transform T.

Optimization (or improvement) can be performed using standard tools for unconstrained numerical optimization, such as steepest descent or conjugate gradient.

Following optimization, the updated LUT can compensate for some amount of distortion. According to an embodiment of the present disclosure, the refreshed LUT is reused to compute new correspondences and to restart optimization to compensate for the remaining distortion. This process repeats until a pre-determined number of iterations is met or until the relative decrease of the cost function between two optimizations (e.g., consecutive optimizations) falls below/within/above a predetermined improvement threshold.

According to an embodiment of the present disclosure, the updated LUT is compared to the original LUT to determine whether or not the change of values is significant. This can help to inform the user if scanner performance changes after calibration is completed.

The comparison of two LUT tables may not be straightforward because the geometry of the reconstructed 3D surface is invariant to any rigid distortion in the LUT. $LUT_1$ and $LUT_2$ are compared after rigid transformation $T_{12}$ is removed. $T_{12}$ can be obtained from the following minimization:

$$Comp(LUT_1, LUT_2) = \min_{T_{12}} \sum_i \|T_{12} T_{LUT1} p_i - T_{LUT2} p_i\|^2$$

Wherein the set $(p_i)_i$ are sampled points in the LUT. According to an embodiment of the present disclosure, points $(p_i)$ are the control points of the LUT. The distance between these two LUTs is a measure of the changes to scanner performance. Above a predetermined threshold, the user can be informed that changes are significant.

Because LUTs are equivalent under rigid transformations, it can be possible to algorithmically determine which LUT is transferred to the scanner. According to an embodiment of the present disclosure, the LUT transferred to the scanner is chosen to be the one with the selected or minimum amplitude. If $LUT_{up}$ is the LUT obtained from the LUT update above, let $LUT_o$ be an LUT with all displacements equal to 0. From the LUT comparison above, it is possible to obtain a rigid transform $T_{12}$ which reduces or minimizes Comp $(LUT_{up}, LUT_0)$. Then the LUT stored in the scanner is chosen to be $T_{12}LUT_{up}$, which has the smallest amplitude.

Materials and Fabrication

Requirements for fabrication of calibration target embodiments according to the present disclosure preferably include one to all of the following:

(i) Periodic spacing of identical surface features. As noted herein, the calibration measurements that are acquired are based on periodicity of surface features along x- and y-directions. For example, for a field of view of 16×12 mm, periodicity of the target 100 features is on the order of 4 mm, with tolerance of about +/−16 microns.

(ii) Close tolerances for height and shaping of features. Because measurements from the calibration target serve as a basis for contour measurement of the teeth or other surfaces, the calibration target should show precision tolerancing, such as in the range of less than 20 microns between similar features. For example, for a depth of field of 14 mm, height h of truncated pyramids that serve as raised features 50 is on the order of 1 mm, with tolerance of about +/−4 microns.

(iii) Angle of oblique surfaces. For the truncated pyramids shown in FIGS. 4A-4C, for example, the four oblique surfaces 54 are at 45 degrees, with tolerance of about +/−0.2 degrees.

(iv) Orthogonal axes. Periodic x, y axes and height h directions are orthogonal to each other, with tolerance of about +/−0.2 degrees.

(v) Periodic defects. Defects in the calibration target that exceed the base tolerance are acceptable only when the defects are themselves periodic.

(vi) Reflectivity. The base material used for calibration target 100 or any coating applied to the base material, such as a spray powder to reduce scatter for example, is selected to enhance the high signal-to-noise ratio to reduce noise effects in calibration.

(vii) Stability. The base material used for calibration target 100 is selected for stability over time under a suitable range of temperature, humidity, barometric pressure, and other conditions.

Materials used for fabrication of calibration target 100 can be formed by machining or using precision molding techniques. Suitable materials can include various types of metals, glass, ceramics, and plastics, for example, that are machined or molded to within the needed precision tolerances for calibration. Calibration target 100 can be a single color, selected to provide measurement conditions that enhance scanner performance or that resemble conditions of use, such as using a suitable off-white color for an intraoral imaging apparatus, for example. Alternately, calibration target 100 can have various markings of other colors, used to enhance measurement or, optionally, for providing color calibration in addition to contour imaging calibration.

As can be appreciated by those skilled in the image processing arts, a computer program for acquiring and processing calibration measurements in an embodiment of the present disclosure can be utilized by a suitable, general-purpose computer system, such as a personal computer or workstation that acts as an image processor, when provided with a suitable software program so that the processor operates to acquire, process, and display data as described herein. Many other types of computer systems architectures can be used to execute the computer program of the present disclosure, including an arrangement of networked processors, for example.

The computer program for performing the method of the present disclosure may be stored in a computer readable storage medium. This medium may comprise, for example; magnetic storage media such as a magnetic disk such as a hard drive or removable device or magnetic tape; optical storage media such as an optical disc, optical tape, or machine readable optical encoding; solid state electronic storage devices such as random access memory (RAM), or read only memory (ROM); or any other physical device or medium employed to store a computer program. The computer program for performing the method of the present disclosure may also be stored on computer readable storage medium that is connected to the image processor by way of the internet or other network or communication medium. Those skilled in the image data processing arts will further readily recognize that the equivalent of such a computer program product may also be constructed in hardware.

It is noted that the term "memory", equivalent to "computer-accessible memory" in the context of the present disclosure, can refer to any type of temporary or more enduring data storage workspace used for storing and operating upon image data and accessible to a computer system, including a database. The memory could be non-volatile, using, for example, a long-term storage medium such as magnetic or optical storage. Alternately, the memory could be of a more volatile nature, using an electronic circuit, such as random-access memory (RAM) that is used as a temporary buffer or workspace by a microprocessor or other control logic processor device. Display data, for example, is typically stored in a temporary storage buffer that is directly associated with a display device and is periodically refreshed as needed in order to provide displayed data. This temporary storage buffer can also be considered to be a memory, as the term is used in the present disclosure. Memory is also used as the data workspace for executing and storing intermediate and final results of calculations and other processing. Computer-accessible memory can be volatile, non-volatile, or a hybrid combination of volatile and non-volatile types.

It is understood that the computer program product of the present disclosure may make use of various imaging and related data manipulation algorithms and processes that are well known. It will be further understood that the computer program product embodiment of the present disclosure may embody algorithms and processes not specifically shown or described herein that are useful for implementation. Such algorithms and processes may include conventional utilities that are within the ordinary skill of the image processing and calibration arts. Additional aspects of such algorithms and systems, and hardware and/or software for producing and otherwise processing the images or co-operating with the computer program product of the present disclosure, are not specifically shown or described herein and may be selected from such algorithms, systems, hardware, components and elements known in the art.

The invention has been described in detail, and may have been described with particular reference to a suitable or presently preferred embodiment, but it will be understood that variations and modifications can be effected within the spirit and scope of the invention. For example, exemplary 3D features have been described with raised 3D features and exemplary 3D feature embodiments can be recessed as well. In addition, exemplary apparatus and/or method embodiments according to the application have been described with 3D features having a periodic pattern in two orthogonal direction, however exemplary 3D feature embodiments can have a pattern repeated with a first distance in a first direction and a second distance in a second direction different than the first direction. The first and second directions can be orthogonal. Further, for certain exemplary embodiments, any pattern of 3D features can be used such that the correlation algorithms described (e.g., correspondence processing) derive to or are satisfied with a single outcome or fall within the prescribed threshold. The presently disclosed exemplary embodiments are therefore considered in all respects to be illustrative and not restrictive.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim.

Exemplary embodiments according to the application can include various features described herein (individually or in combination).

The invention has been described in detail, and may have been described with particular reference to a suitable or presently exemplary embodiment, but it will be understood that variations and modifications can be effected within the spirit and scope of the invention. In addition, while a particular feature of the invention can have been disclosed with respect to one of several implementations, such feature can be combined with one or more other features of the other implementations as can be desired and advantageous for any given or particular function. The term "at least one of" is used to mean one or more of the listed items can be selected. The term "about" indicates that the value listed can be somewhat altered, as long as the alteration does not result in nonconformance of the process or structure to the illustrated embodiment. Other embodiments of the invention will be apparent to those skilled in the art from consideration of the specification and practice of the invention disclosed herein. It is intended that the specification and examples be considered as exemplary only, with a true scope and spirit of the invention being indicated by the following claims, and all changes that come within the meaning and range of equivalents thereof are intended to be embraced therein.

What is claimed is:

1. An apparatus for surface contour imaging of an object, the apparatus comprising:
    a housing;
    an illumination apparatus within the housing and energizable to direct one or more illumination patterns toward a surface position;
    a sensing apparatus within the housing and comprising at least one lens and a sensor that is energizable to obtain one or more images of the surface position corresponding to the illumination patterns; and
    a calibration target detachably coupled to the housing of the apparatus in the surface position,
        wherein the calibration target comprises a set having a plurality of 3D features that are uniformly spaced apart a first distance along the first direction and uniformly spaced apart a second distance along a second direction, where the first and second directions define a first plane and having a portion of uniform height along a height axis that is orthogonal to the first plane, and wherein each of the 3D features in the set further has at least a first slanted surface that is oblique with respect to the first plane and oblique with respect to the height axis.

2. The apparatus of claim 1 wherein the calibration target is housed within a calibration target fixture and wherein the calibration target fixture is keyed to detachably couple to the sensing apparatus in a predetermined orientation.

3. The apparatus of claim 2 wherein the calibration target fixture provides an adjustment for changing a distance between the calibration target and the sensing apparatus.

4. The apparatus of claim 1 where the first and second directions are orthogonal, where the 3D features are raised truncated pyramids or raised truncated cones.

5. The apparatus of claim 1 where the first and second directions are orthogonal, where the 3D features are recessed truncated pyramids or recessed truncated cones.

6. The apparatus of claim 1 wherein the calibration target is ceramic, metal, or plastic.

7. The apparatus of claim 1 wherein the calibration target is coated.

8. An intra-oral portable scanning apparatus for surface contour imaging of dentition, comprising:
    an illumination apparatus energizable to direct one or more illumination patterns toward a surface position;
    a sensing apparatus comprising at least one lens and a sensor that is energizable to obtain one or more images of the surface position corresponding to the illumination patterns; and
    a calibration fixture detachably coupled to the intra-oral portable scanning apparatus,
        wherein the calibration fixture holds a calibration target at the surface position, the calibration target includes a set of three-dimensional (3D) features, each 3D feature having at least one planar surface and wherein the calibration fixture provides an adjustment that changes a distance between the calibration target and the sensing apparatus.

9. The apparatus of claim 8, where the set includes a plurality of 3D features arranged in a pattern, each 3D feature having planar surfaces that extend in three orthogonal dimensions, where the 3D features are raised or recessed.

10. The apparatus of claim 8, where the calibration target is housed within a calibration target fixture and wherein the target fixture is keyed to detachably couple to the sensing apparatus in a predetermined orientation.

11. The apparatus of claim 8 wherein, with the calibration fixture coupled to the apparatus, each surface of each raised feature of the calibration target lies in the field of view of the sensing apparatus.

12. A method for calibration of a portable scanning device, the method comprising:
  (a) coupling a fixture to the scanning device, wherein the fixture disposes a calibration target at an operator-selectable first distance from an objective lens of the scanning device, wherein the calibration target comprises an array of matching three-dimensional (3D) features;
  (b) acquiring a plurality of images of the calibration target and generating a point cloud that is indicative of the 3D features of the calibration target surface;
  (c) calculating first dimensions between corresponding selected portions of the 3D features in the array including position, 3D feature height or surface angle, and identifying first calibration error according to the first calculated dimensions;
  (d) moving the calibration target using the fixture to an operator-selectable second distance from the objective lens of the scanning device and acquiring a plurality of images of the calibration target and generating a point cloud that is indicative of the 3D features of the calibration target surface at the second distance;
  (e) calculating second dimensions between the corresponding selected portions of the 3D features in the array at the second distance including position, 3D feature height or surface angle, and identifying second calibration error according to the second calculated dimensions; and
  (f) updating calibration data for the scanning device according to the first calculated dimensions and first calibration error and the second calculated dimensions and second calibration error, and storing the updated calibration data in a memory.

13. The method of claim 12 further comprising displaying one or more calibration target point clouds to the operator.

14. The method of claim 12 wherein updating calibration data comprises computing a cost function.

15. The method of claim 12, where the calibration target comprises at least one array of uniformly spaced raised 3D features.

16. The method of claim 12, further comprising detaching the fixture from the portable scanning device.

17. The method of claim 12, where the portable scanning device is an intra-oral portable scanning apparatus for surface contour imaging of dentition.

18. The apparatus of claim 1, wherein the calibration target is physically attached to the apparatus in a calibration mode, and wherein the calibration target is physically removed from the apparatus in a surface contour imaging mode.

* * * * *